H. A. SCOTT.
ACCELERATING MECHANISM FOR AUTOMOBILES.
APPLICATION FILED JUNE 15, 1915.

1,183,043.

Patented May 16, 1916.

Inventor
H. A. Scott

By Watson E. Coleman
Attorney

UNITED STATES PATENT OFFICE.

HIRAM A. SCOTT, OF MADELIA, MINNESOTA.

ACCELERATING MECHANISM FOR AUTOMOBILES.

1,183,043.  Specification of Letters Patent.  Patented May 16, 1916.

Application filed June 15, 1915. Serial No. 34,145.

*To all whom it may concern:*

Be it known that I, HIRAM A. SCOTT, a citizen of the United States, residing at Madelia, in the county of Watonwan and State of Minnesota, have invented certain new and useful Improvements in Accelerating Mechanism for Automobiles, of which the following is a specification, reference being had to the accompanying drawings.

My invention relates to automobiles, and particularly to accelerators therefor.

The primary object of my invention is the provision of a pedal controlled accelerator for motor cars particularly adapted to Ford cars, and further to provide an accelerator mechanism which can be readily attached to this type of car without changing the construction or attachment of the usual hand controlled mechanism for this purpose.

A further object of the invention is the provision of an accelerating attachment which will be very simple in construction, readily applied, and which will not readily get out of order.

Other objects will appear in the course of the following description.

Figure 1:
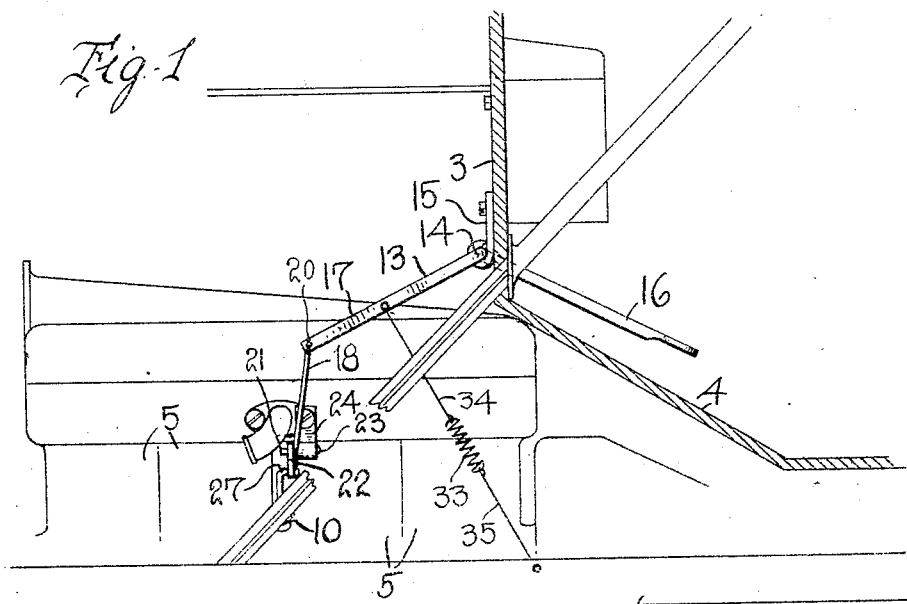
Figure 2:
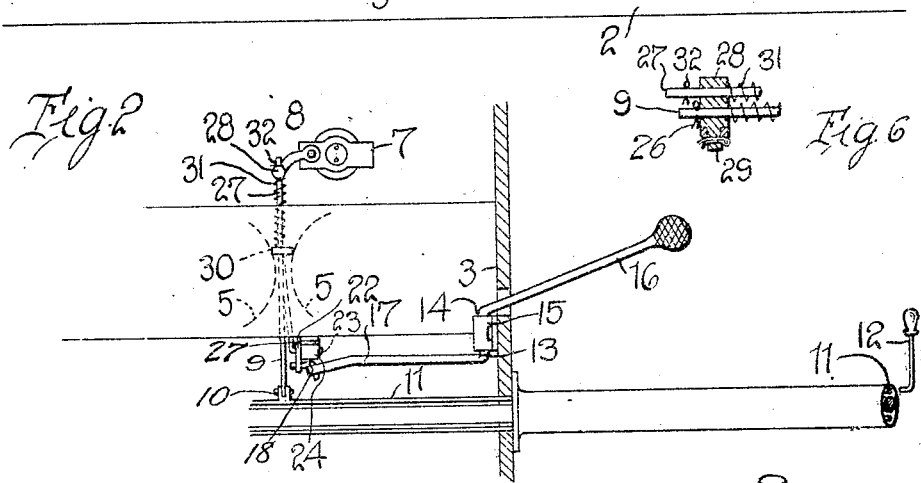
Figure 6:
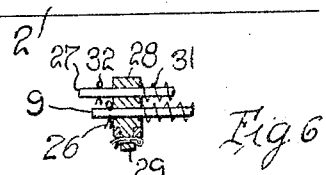
Figure 3:
Figure 4:
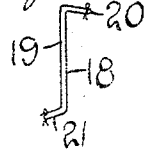
Figure 5:
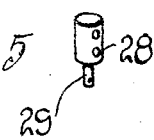

My invention is illustrated in the accompanying drawings, wherein:

Figure 1 is a side elevation, partly in section, of the forward end of a motor car showing my attachment applied thereto; Fig. 2 is a plan view of the construction shown in Fig. 1; Fig. 3 is a perspective view of the bell crank; Fig. 4 is a perspective view of the link connecting the pedal to the bell crank; Fig. 5 is a perspective view of the slide 28; Fig. 6 is a fragmentary view showing the rod 27 with the slide in section thereon.

Referring to these drawings, 2 designates part of the frame of a Ford motor car and 3 the dash board thereof, 4 designating the floor of the car, while 5 designates the cylinders. All these parts are of the usual construction found in motor cars of this type.

The carbureter 7 is provided with the carbureter arm 8 which is as ordinarily constructed and which is ordinarily operated in cars of the Ford type by means of a connection 9 extending transversely across the car and pivotally connected to the arm 10 mounted upon the rock shaft 11, this shaft extending up parallel to the steering post and having at its upper end a lever 12 whereby the shaft or rod 11 may be rotated. This is the ordinary means for controlling the feed of gas from the carbureter to the engines.

My invention consists in an attachment, part of which is adapted to be mounted upon the dash board of the machine and which includes a pedal operatively connected by certain cranks and levers to the carbureter arm, the connection to the carbureter arm being so formed that while the actuation of the pedal will oscillate the carbureter arm the actuation of the shaft 11 by the hand lever 12 will not actuate the pedal.

In detail I provide a member 13 consisting of a rod having a middle portion 14 which is disposed in a horizontal plane and parallel to the dash board and which is rotatably mounted in a supporting bracket 15. From this portion 14 of the member extends the arm 16 which forms the pedal proper, while from the opposite end of the portion 14 extends an arm 17. As clearly shown in Fig. 1, these arms 16 and 17 have an obtuse angled relation to each other, the pedal arm 16 extending downward approximately parallel to the upwardly inclined forward end of the floor 4, while the arm 17 extends forward and downward. This arm 17 is perforated at its forward end for engagement with an angular link 18. This link consists of a vertically extending rod 19 bent at right angles at its upper end, as at 20, and also bent at right angles at its lower end, as at 21, the portion 21 being disposed in a vertical plane at right angles to the portion 20. The terminal end 20 is inserted through the perforation in the extremity of the arm 17 of the pedal lever and is held in proper position by means of a cotter pin, or other suitable holding device.

The terminal end 21 of the member 18 is engaged with a bell crank lever 22, pivotally connected by a pin 23 to a supporting bracket 24, the other arm of the bell crank lever being pivotally connected to a transversely extending rod 27. This rod extends transversely across the machine in the space between two of the cylinders 5, and carries upon it adjacent its opposite end the sliding head 28 having a depending pin or like member 29 which engages with the extremity of the carbureter arm 8. Mounted upon the rod 27 is a collar or abutment 30, and disposed between this collar 30 or abutment is a coiled compression spring 31 which bears at its end against the sliding head 28. A cotter pin 32 acts as a stop to limit the outward movement of the sliding head 28 with relation to the rod 27. Any other form of stop may be used, however, for this purpose. The rod 9 passes loosely through the head 28, and a cotter pin 26 acts as a stop to limit the outward movement of the sliding head 28 with relation to the rod 9.

The pedal is yieldingly held in its normal position by means of a spring 33, which, at its upper end, is connected by a wire 34 to the arm 13 of the pedal lever, the lower end of the spring being connected to wire 35 extending downward to the frame of the machine and attached thereto.

In the practical operation of this device a depression of the pedal 16 will cause an actuation of the bell crank lever 22, which in turn will cause a pull upon the rod 27. This will cause the stop 32 to engage the head 28, thus causing the head 28 to move with the rod 27 and this in turn will cause an oscillation of the carbureter arm, thus opening the throttle valve of the carbureter, allowing a larger charge to pass to the engine and accelerating the speed thereof in a manner well known to those skilled in the art. If it is desired to operate the carbureter by the hand lever 12 in the usual manner, this hand lever 12 is shifted, rotating the shaft 11 and causing strain upon the connection 9 which will pull the carbureter arm to open the throttle valve, but as the head 28 is slidably mounted upon the rod 27 the movement of the arm 8 will not shift the rod 27 but will simply shift the rod through the sliding head 28 on the rod and thus no movement of the pedal 16 will be caused by a manual actuation of the carbureter arm.

The bracket 14 for the pedal 16 is preferably mounted upon the coil box bolt and on the engine side of the dash 3. The bracket 24 is mounted on the water connection of the engine by means of one of the stop bolts holding the connection in place.

It will of course be noted that with my construction the throttle valve may be opened to any desired extent by means of the lever 12, and then the actuation of the pedal will throw the throttle valve fully open, if desired. Thus the normal working position of the throttle valve may be regulated by the lever 12 and the pedal only used in emergencies to actuate the throttle valve.

Having thus described my invention, what I claim is:

In combination with a carbureter and its operating arm, rods, a slide mounted on the rods, an operative connection between the slide and the carbureter arm, stops carried by the rods engageable with the slide upon movement of the rods in one direction, tension means for imparting movement to the slide in an opposite direction, means for imparting movement to one of the rods in one direction, means for imparting movement to a second rod comprising a member pivotally supported intermediate its length, one of the extremities being provided with a pedal, a bell crank lever, an operative connection between the opposite extremity of the member and the bell crank lever, said bell crank lever being operatively connected with the second named rod.

In testimony whereof I hereunto affix my signature in the presence of two witnesses.

HIRAM A. SCOTT.

Witnesses:
WILLIAM MASSER,
ARDEN DRESSER.